J. MATTHEWS.
Vessel for Containing Gases and Liquors under Pressure.
No. 159,433.
Patented Feb. 2, 1875.
FIG. I.
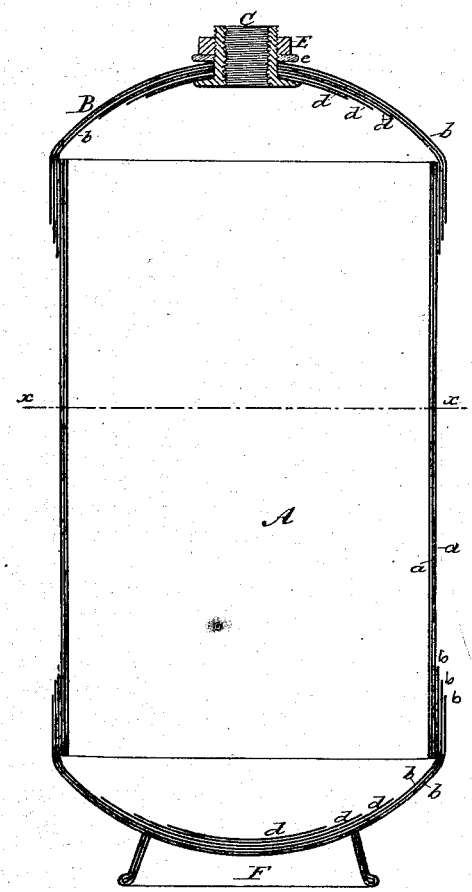
FIG. III.
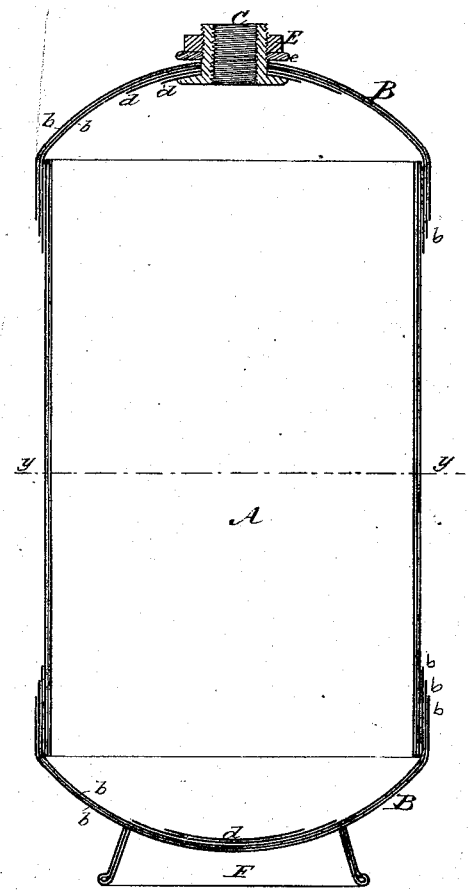
FIG. II.
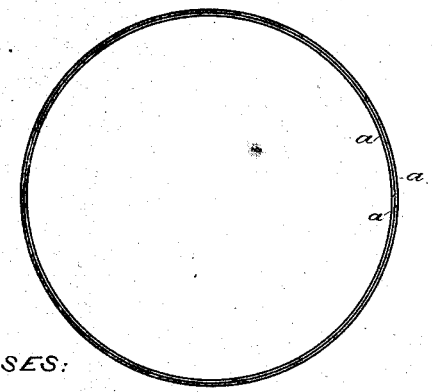
FIG. IV.
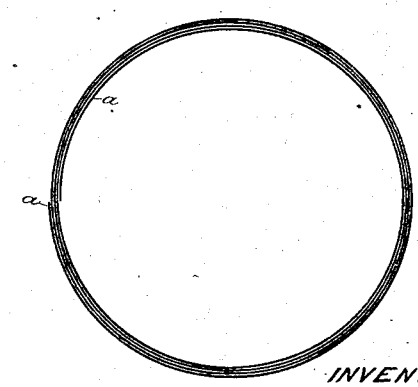
WITNESSES:
INVENTOR:

UNITED STATES PATENT OFFICE.

JOHN MATTHEWS, OF NEW YORK, N. Y.

IMPROVEMENT IN VESSELS FOR CONTAINING GASES AND LIQUIDS UNDER PRESSURE.

Specification forming part of Letters Patent No. 159,433, dated February 2, 1875; application filed August 7, 1874.

CASE C.

*To all whom it may concern:*

Be it known that I, JOHN MATTHEWS, of the city, county, and State of New York, have invented certain new and useful Improvements in Lamellar Vessels for Containing Liquefied or Compressed Gases; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figures 1 and 3 are longitudinal sections, and Figs. 2 and 4 cross-sections, through lines $x\ x$ and $y\ y$ of Figs. 1 and 3, respectively.

The object of this invention is to make strong vessels for containing liquefied gases, highly-condensed or dissolved gases, which exert great pressure on the vessel. Such vessels, as heretofore constructed, are made of a single wall or shell, or of one or more single walls placed one within the other. In my invention I make the walls of the vessels lamellar, or of multiple shells united, so that each re-enforces the other. In the arts it is important to have very strong vessels, as the bursting of them occasions very serious consequences—sometimes the loss of life. In my invention the multiple walls, which are made of tough metal, such as steel, are united together by tin or other soldering-metal, so that any imperfections in one plate are corrected by the other plate or plates.

In the drawing I have shown different modes of accomplishing this object. Thus, in Figs. 3 and 4 the body of the vessel is made by taking a plate of steel, coating it with tin, and then coiling it in a volute, and, after that, sweating together the several plies. The caps or ends are made by placing several caps one within the other, and sweating them together.

I unite the caps and the body as in my patent of June 13, 1872, No. 128,411, or as described in another application filed of even date with this; or, instead of coiling the body, it may be made by placing one shell within another and sweating them together, and then putting on the caps as above. This form is shown in Figs. 1 and 2. Around the bung I place a number of washers, as shown in Figs. 1 and 3, so as to re-enforce that part.

When the apparatus is to be used for soda-water, mineral waters, ale, wine, or other beverages, I line the inside with some innocuous material, such as glass, with suitable packing, as described in two other applications filed of even date with this. When the vessel is to be used with corrosive material other than beverages, I line, preferably, with lead or some cheap metal or alloy which will not be corroded by the contained liquid or gas; or the inner lining may be of glass or porcelain, with a soft-metal lining between the strong shell and the glass or porcelain vessel, with the packing on the inside or outside of the soft metal, so as to fill the space between the shell and the inner vessel. The reservoir or vessel constructed according to this invention is suitable for holding liquefied carbonic acid, liquid nitrous oxide, ammonia, highly volatile hydrocarbons, and, in fact, all those gases which require great pressure to retain them in a liquid form. It is also applicable as a fountain for containing liquids highly charged with gases, and as a reservoir for highly-compressed air, and other gases used for motive power. These liquefied gases, such as carbonic acid, are now used with advantage for propelling torpedo and other boats, and highly-compressed air is used as a means of storing up mechanical power for moving purposes. By my invention the bursting of the vessels used for holding these substances is very much lessened, if not entirely avoided. By giving the walls a lamellar form a greater average strength is obtained for a given weight of metal, since the strain is equally distributed, so that the principle is applicable to vessels requiring lightness as well as strength.

The following description will enable those skilled in the art to make and use my invention.

In the drawing, A is the body of the vessel, which is composed of two, three, or more plies, as shown at $a\ a\ a$, and is made by inserting one closely-fitting vessel into another, as shown in Figs. 1 and 2, or by coiling to form a volute, as shown in Figs. 3 and 4. The caps B B are made of deep caps, two, three, or more in number, as shown at *b b b*. C is the bung-piece, with a broad flange on the inside. Between the cap and this flange are interposed a number of washers, *d d d*, so as to re-enforce the wall where it is weakened by openings. E is a nut; *e*, a washer or packing, so as to make a firm joint between the vessel and the piece C. F is the foot for supporting the vessel when required. If openings are required in the side or other part of the vessel, they should be strengthened by washers, such as shown at *d d d*. Instead of a single coiled plate, the body may be made of several plates spirally coiled, so that one breaks joint with the other.

The plates are first tinned, and then put together, and afterward sweated together, and also the seams and spaces between the plates, so as to unite all in one solid piece. The vessels formed in this manner are not only very strong, but resist the passage of gases much better than those made in the ordinary way.

The manner of inserting glass and other linings, and packing the spaces between the shell and the lining, is described in my other applications for patents filed of even date with this.

The method of forming the cup-shaped caps, the kinds of metal to be used for the plates, and the processes of preparing them for use, being already known, and forming no part of this invention, need not be described.

The following is the method of joining the seams which I use, and which is applicable to all kinds of vessels of iron and steel: I first galvanize or coat with zinc the whole of the sheet-steel intended for the jacket or shell or shells, and then, by means of a blow-pipe, melt tin upon the surface intended to form the joints. This tin alloys itself with the zinc, forming a very fusible alloy, which is carefully wiped off clean. The process is then repeated until little or no zinc is left upon those portions intended to form the joints. These parts are afterward united by means of tin solder, and a very firm joint is formed. This process constitutes a part of my invention.

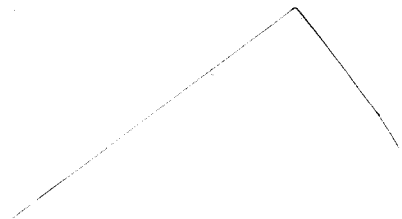

Having thus described my invention, what I claim, and desire to secure by Letters Patent, is—

1. The method herein described for forming strong vessels to contain gases and liquids under high pressure, consisting in coating a sheet of steel or other tough metal with tin or other soldering-metal, coiling into a volute or spiral, and then sweating the parts together, substantially as set forth.

2. The method of forming caps or ends for strong vessels, consisting in sweating together a number of steel or other tough-metal caps coated with a soldering-metal, as set forth.

3. A lamellar vessel for containing liquids and gases under great pressure, having the several plies united by tin or soldering-metal, as described.

4. A lamellar cap or end for strong vessels, composed of a number of caps united by soldering-metal, as set forth.

5. The combination of the re-enforcing washers *d* with the end or body of the vessel, so as to re-enforce the parts weakened by apertures, as set forth.

In testimony that I claim the foregoing as my own I have affixed my signature in presence of two witnesses.

JOHN MATTHEWS.

Witnesses:
S. A. CURTIS,
WILL. C. DAVIS.